United States Patent
Zehler

(10) Patent No.: US 10,708,451 B1
(45) Date of Patent: Jul. 7, 2020

(54) METHOD AND SYSTEM FOR DEVICE LOCATION UPDATING USING MAP VALIDATION BY AN END USER

(71) Applicant: Xerox Corporation, Norwalk, CT (US)

(72) Inventor: Peter J. Zehler, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 16/250,340

(22) Filed: Jan. 17, 2019

(51) Int. Cl.
*G06F 3/12* (2006.01)
*H04N 1/00* (2006.01)
*H04L 29/08* (2006.01)

(52) U.S. Cl.
CPC ....... *H04N 1/00411* (2013.01); *G06F 3/1204* (2013.01); *G06F 3/1231* (2013.01); *H04L 67/18* (2013.01)

(58) Field of Classification Search
None
See application file for complete search history.

(56) References Cited

U.S. PATENT DOCUMENTS

| | | | |
|---|---|---|---|
| 8,467,990 B2 | 6/2013 | Zehler | |
| 9,747,768 B1 | 8/2017 | Zehler et al. | |
| 9,854,148 B2 | 12/2017 | Tredoux et al. | |
| 2007/0024896 A1* | 2/2007 | Bounar | G06F 3/1204 358/1.15 |
| 2011/0221846 A1* | 9/2011 | Smith | G06K 1/121 347/107 |
| 2011/0228322 A1* | 9/2011 | Ashikawa | G01C 21/32 358/1.15 |
| 2017/0318436 A1* | 11/2017 | Fujimoto | H04W 4/023 |

\* cited by examiner

*Primary Examiner* — Huo Long Chen
(74) *Attorney, Agent, or Firm* — Fay Sharpe LLP

(57) ABSTRACT

Systems and methods for tracking large deployments of managed devices in a facility are disclosed. A tracking system is embedded into the managed devices, which may include, for example, printers, copiers, scanners, and multi-function devices (MFD). Location information is generated and maintained using an external server, and when a deployment location check event is triggered, a user of the device is prompted to confirm its deployment location and/or update its location information.

16 Claims, 5 Drawing Sheets

METHOD AND SYSTEM FOR DEVICE LOCATION UPDATING USING MAP VALIDATION BY AN END USER

BACKGROUND

In large deployments of managed devices in a facility, such as printers, copiers, scanners and multifunction devices (MFD), it is difficult to track the devices that have been moved, added, or removed from the facility. Further, for large facilities that have multiple floors and/or wings, and many rooms, there may be dozens or even hundreds of machines scattered throughout the facility. Over time, devices may be replaced, new devices may be added, old devices may be removed, and existing devices may be moved from floor to floor, or room to room. For such large deployments of devices, managing the location information for these many devices can be very difficult, and only increases in complexity as time goes on.

Existing methods use a number of approaches to keeping track of devices. For example, some approaches use the geolocation of a deployed device to manage its location, but not all devices that a manager may wish to track are GPS-enabled, and therefore would require the use of the additional equipment each time a device location's was changed. Other approaches involve specific network infrastructures. However, such methods are not very accurate and can result in ambiguities since multiple devices (e.g., multiple printers) may be connected to a network hub, thereby making differentiating between the multiple devices more difficult. Traditional systems tracking this information are not integrated directly with the managed devices and thus depend on human interaction to update the centralized record of device locations. The day-to-day users of these devices are not involved, and the devices themselves often have no knowledge of their absolute or relative location or when there is a change to their location. These methods are not user-friendly, are error prone, and present significant barriers to the effective management of large deployments of devices.

INCORPORATION BY REFERENCE

U.S. Pat. No. 8,467,990, issued Jun. 18, 2013, by Peter J. Zehler and entitled "METHOD FORE SETTING THE GEOLOCATION OF A NON-GPS ENABLED DEVICE".

BRIEF DESCRIPTION

The present disclosure sets forth systems and methods of tracking large deployments of portable devices, such as printers, copiers, scanners and multifunction devices (MFD), that leverages device end-users into the maintenance of the deployment tracking and integrates the devices into the management system.

More specifically, the system include a portable multi-function device having a user interface device, a network interface, a processor, and a non-transitory computer-readable memory device containing programming instructions that are configured to instruct the processor to: receive a user-supplied floorplan; process the user-supplied floorplan to extract one or more location features; receive input from a user, via the user interface device, wherein the input includes at least either the deployment location of the portable multi-function device, or a validation signal of the deployment location of the portable multi-function device; communicate with a server, via the network interface, to send location information associated with the portable multi-function device to the server to be stored in a memory of the server; and communicate with the server, via the network interface, to receive location information associated with the portable multi-function device that is stored in the memory of the server. In particular embodiments, the location information associated with the portable multi-function device can include the user-supplied floorplan, the one or more location features extracted from the user-supplied floorplan, or the input received from the user. In further embodiments, the location information can include network configuration information for the portable multi-function device as well as processed versions of the user-supplied floorplan.

In accordance with one embodiment, a system for tracking the deployment location of a portable multi-function device, or a plurality of multi-function devices

DETAILED DESCRIPTION

As used herein, the singular forms "a," "an," and "the" include plural references unless the context clearly dictates otherwise. Unless defined otherwise, all technical and scientific terms used herein have the same meanings as commonly understood by one of ordinary skill in the art. Also, in this document the term "comprising" means "including, but not limited to."

In this document, the term "connect" and its variants mean either a physical connection or a non-physical connection via which two devices may share data and/or instructions via signals sent via a wired or wireless communication protocol.

The terms "mobile electronic device," "mobile device" and "portable electronic device" as used herein are interchangeably used and mean an electronic device that includes a processor and a non-transitory, computer-readable medium, and which is configured to be portable. Examples of portable electronic devices include smartphones, personal digital assistants, cameras, tablet devices, electronic readers, laptop computers, media players, satellite navigation devices and the like.

Figure 1:
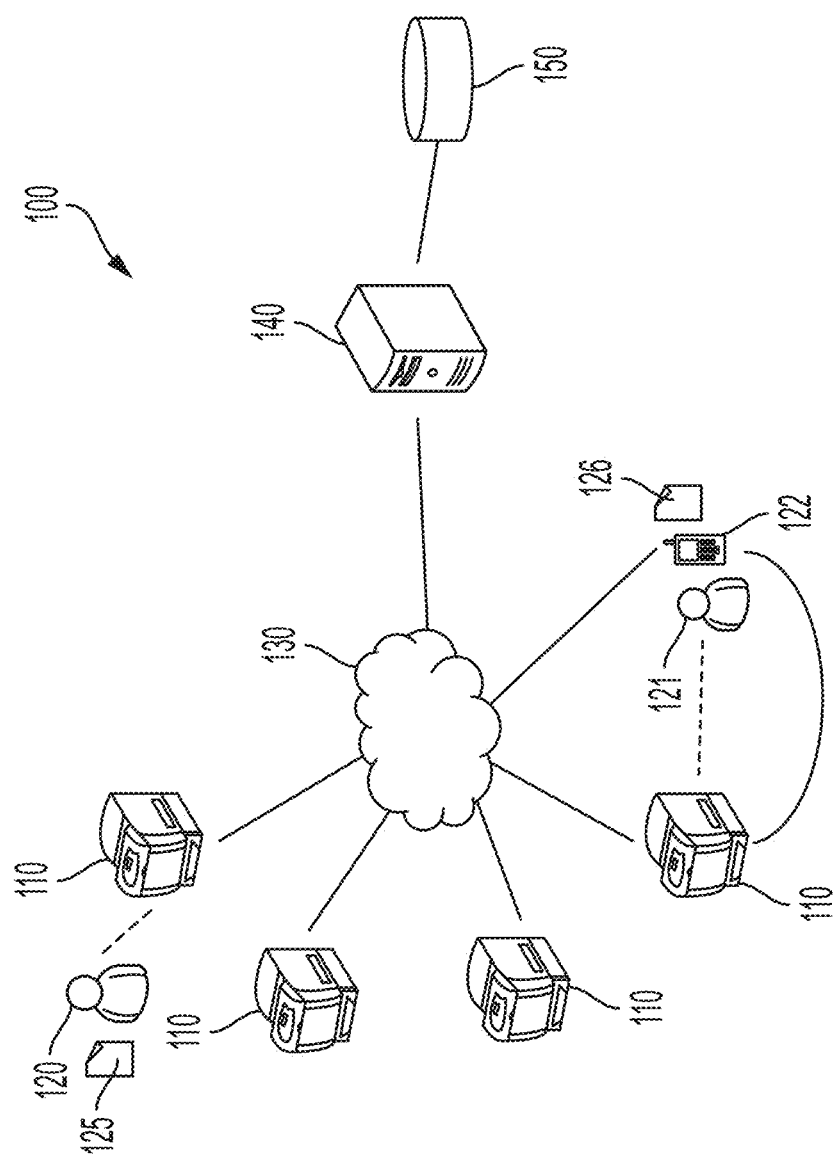
FIG. 1 is a diagram illustrating various components of a system for tracking the deployment location of a portable multi-function device, including a plurality of portable multi-function devices.

Turning now to the drawings, and initially to FIG. 1, aspects of the present disclosure will now be described in detail. In FIG. 1, various components of a system 100 for tracking the deployment location(s) of a portable multi-function device, or a plurality of multi-function devices. The system 100 includes one or more portable multi-function devices 110, such as a plurality of the multi-function devices 110, which are connected to a local communication network 130. The system 100 can further include a server 140, such as a remote server 140. The server 140 can be connected to the portable multi-function devices 110, such as, for example, via a local communication network 130, or via another communication network (not shown). The server 140 can also have memory storage device 150 to store information relating to the portable multi-function devices 110, such a database of information relating to the location of the plurality of multi-function devices 110. A user 120 may operate the multi-function devices 110 directly, or as discussed further below, may use a secondary device 122, such as a mobile phone or tablet device, connected to the network 130 in addition to the device 110. In various embodiments, the user 120 provides a floorplan 125, 126 that includes the room or area the portable multi-function device will be placed in. In some embodiments, the device 110 may have an image capture device, such as a scanner or camera, which the user 120 may use to scan a physical copy of the user-supplied floorplan 125. In other embodiments, the user 121 may use a secondary device 122, to provide an electronic version of the user-supplied floorplan 126. The secondary device 122 may connect with the multi-function device 110 directly or over a communication network, such as network 130. The floorplan 125, 126 associated with the portable multi-function devices 110 may be transmitted to the server 140 and stored in the memory 150 for later retrieving and validation of deployment location, as discussed later herein.

Figure 2:
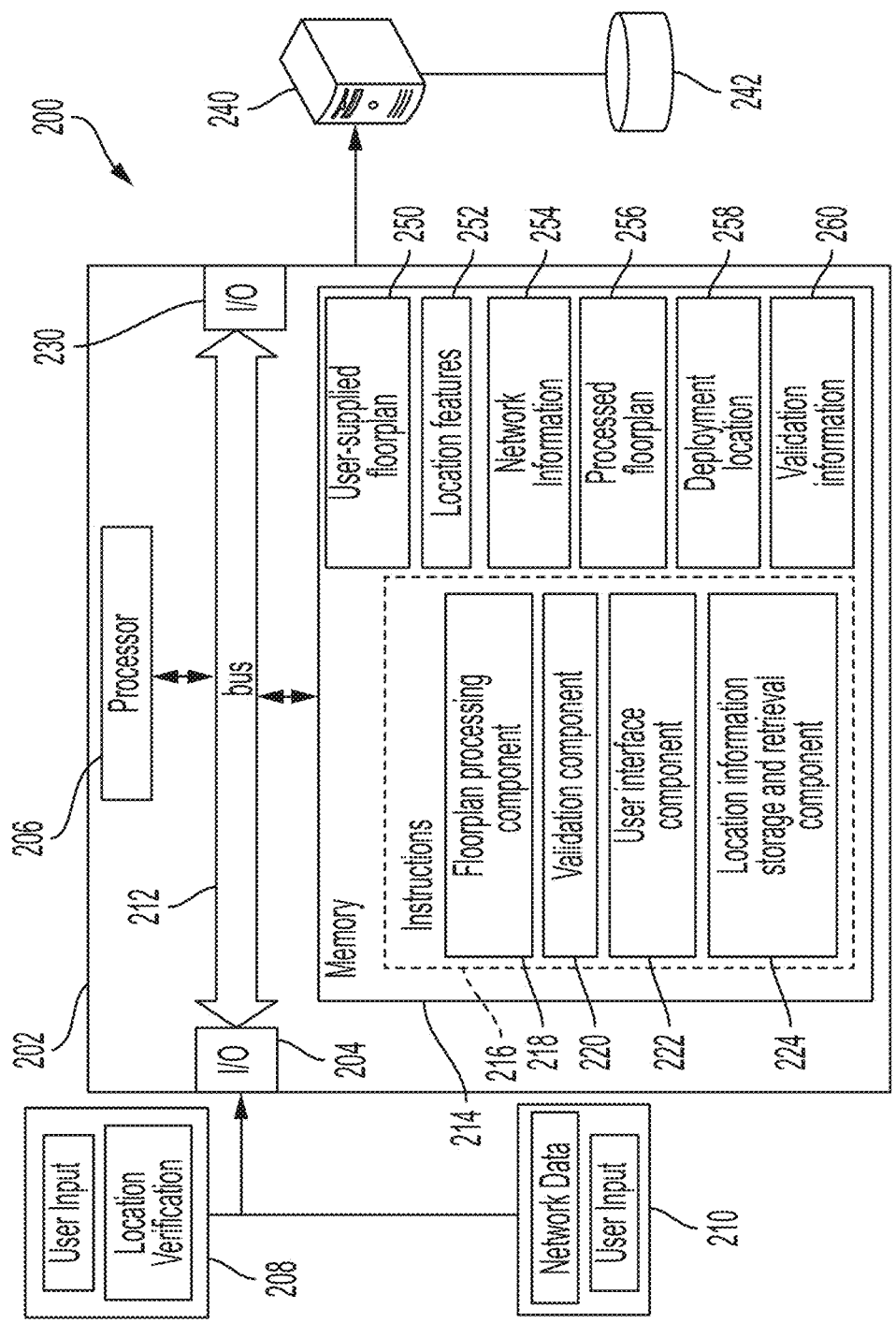
FIG. 2 is a functional block diagram of a system for tracking the deployment location of a portable multi-function device.

Turning to FIG. 2, a tracking system 200 tracks and validates the deployment location of a portable multi-function device 202. The system includes at least one portable multi-function device 202 having memory 214, which stores instructions 216 performing the exemplary method, and a processor 206, in communication with the memory 214 for executing the instructions 216. In particular, the processor 206 executes instructions for performing at least a part or all of the method outlined in FIG. 6. The processor may also control the overall operation of the multi-function device 202, including functions such as scanning and copying documents, instructions for which may also be stored in memory 214. The system includes one or more input/output interfaces 204, 230. The I/O interface 204 may communicate with a user device (e.g., device 122 shown in FIG. 1). The input/output interfaces 204, 230 may be a user interface device or a network interface device. The user interface device 204 may include a touch-screen-enabled display screen device for receiving input 208 from a user. The user interface 204 may be used for displaying information to users, and for inputting text and other input 208 from the user, such as command selections to the processor. The user interface 208 may include one or more of a keyboard, keypad, touch screen, writable screen, and a cursor control device, such as a mouse, trackball, or the like. The input/output interface 204 may also include a network interface, and receive additional input 210, such as network configuration information from a local or private wired or wireless communications network, or a floorplan supplied by a user electronically. The input/output interface 230 may communicate with an external device, such as a server 240 having a memory storage device 242.

Other various hardware components 204, 206, 214, and 230 may be connected via a data/control bus 212. The system may include a plurality of multi-function devices 202, each connected to one or more external servers 240.

The system 200 may include one or more of a portable electronic 202 such as printers, copiers, scanners and multifunction devices (MFD), server computers, and other computing devices capable of executing instructions for performing the exemplary method.

The memory 214 may represent any type of non-transitory computer readable medium such as random access memory (RAM), read only memory (ROM), magnetic disk or tape, optical disk, flash memory, or holographic memory. In one embodiment, the memory 214 comprises a combination of random access memory and read only memory. In some embodiments, the processor 206 and memory 214 may be combined in a single chip. The input/output (I/O) interface 204, 230 allow(s) the device 202 to communicate with other devices and users via a computer network, such as a local area network (LAN) or wide area network (WAN), or the internet, and may comprise a modulator/demodulator (MODEM), a router, a cable, and/or Ethernet port. Memory 214 stores instructions for performing the exemplary method as well as the processed data, as necessary, such as location features of the tracked device(s).

The digital processor 206 can be variously embodied, such as by a single-core processor, a dual-core processor (or more generally by a multiple-core processor), a digital processor and cooperating math coprocessor, a digital controller, or the like.

The term "software," as used herein, is intended to encompass any collection or set of instructions executable by a computer or other digital system so as to configure the computer or other digital system to perform the task that is the intent of the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on a server or other location to perform certain functions.

The software instructions 216 may include various components for implementing parts of the method. Some or all of the software components may be wholly or partly resident on the portable device being tracked (e.g., devices 110 in FIG. 1). For example, as illustrated in FIG. 2, the instructions 216 include a floorplan processing component 218, a deployment validation component 220, a user interface component 222, and a location information storage/retrieval component 224.

In accordance with one aspect of this disclosure, the user input 208, 210 includes a user-supplied floorplan, which shows one or more potential deployment locations for the associated multi-function device 202. The user interface component 222 may acquire the user-supplied floorplan, and other user input, in several different manners. In one embodiment, the device 202 may include an image capture device, such as a camera or scanner, which may transfer an image of a physical copy of the user-supplied floorplan. In other embodiments, the user interface component 222 may acquire the user-supplied floorplan via a network interface, i.e., may receive an electronic version of the floorplan from the user via a secondary device, such as a mobile device. The user interface component 222 is also configured to receive other input 208, 210 from a user, via a touch-enabled display screen and/or a network interface device, for example. As described above, the input 208, 210 acquired by the user interface component 222 at the input/output interfaces 204, 230 may include various floorplans associated with the multi-function device 202, location validation signals, network configuration information, and other information.

Once a user-supplied floorplan has been received by the system 200, the floorplan processing component 218 analyzes the floorplan to extract one or more location features. In particular embodiments, the location features correspond to individual rooms, identified by the floorplan processing component 218, in which the device 202 may be deployed. In further embodiments, the floorplan processing component 218 may modify the floorplan to graphically identify at least one of the one or more extracted location features. For example, with reference to FIG. 3, the processing component 218 has identified several location features 302, 304, 306, 308, 320, 322, 324 corresponding to various rooms within the floor plan 300. The processing component 218 may graphically identify the extracted location features in several ways, such as by outlining each feature or by highlighting each feature with a particular color. Each method of graphically identifying a location feature may also indicate whether a location feature corresponds to a device 202 being tracked. For example, the extracted location features 302, 304, 306, 308 are outlined, but do not have any shading, indicating that a device 202 is not currently deployed in that location. Alternatively, location features 320, 322, and 324 are outlined and shaded, possibly indicating that a device 202 being tracked by the system 200 is deployed at each of those locations 320, 322, 324.

Figure 3:
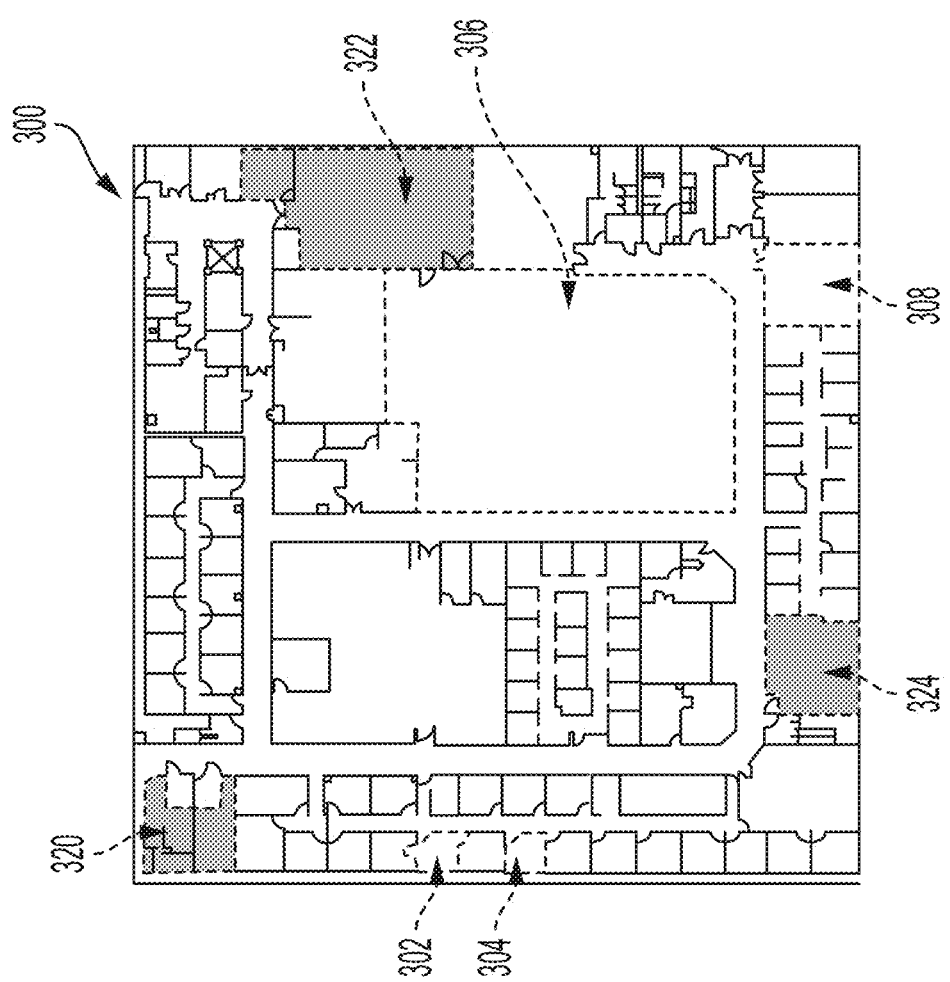
FIG. 3 is an illustration of a system processed user-supplied floorplan showing several extracted location features.

Returning to FIG. 2, the validation component 220 validates the deployment location of the device 202. In particular embodiments, the validation component 220 may cause the user interface component 222 to display, via the user interface device 204, the processed floorplan (such as seen in FIG. 3). A user may then be prompted, via the user interface component 222, for a location verification signal 208. For example, a user of the device 202 may be shown the processed floorplan 300 and asked to confirm whether the deployment location of the device 202 is accurate. Based on the input 208, 210 received, the validation component 220 may request that the user input, via the user input device 204, a new deployment location for the device 202. If the deployment location 258 for the device 202 no longer corresponds to any of the location features 252 extracted from the user-supplied floorplan 250, the user may be prompted to provide a new floorplan associated with the new deployment location of the device 202, which may then be processed by the processing component 218 as described above.

The validation component 220 may be set to validate the deployment location 258 of the device 202 based upon certain validation conditions 260, or a combination of conditions 260. For example, in particular embodiments, the validation component 220 may monitor the network configuration information 254 of the device 202 for changes, and request validation of the deployment location 258 of the device 202 if the network configuration information changes (e.g., a change in IP address, or after a period of being disconnected from the network, etc.). In other embodiments, the validation component 220 may be triggered when a pre-determined threshold is met, such as a pre-determined amount of time. For example, the validation component 220 may be triggered, and a user is prompted to validate the deployment location 258 of the device 202, once 7 days has elapsed since the last validation, or once 30 days has elapsed since the last validation. This period of time may be configurable, for example, depending on the type of device. Alternatively, the validation component 220 may be triggered, and a user is prompted to validate the deployment location 258 of the device 202, after the device 202 has been used a certain number of times. For example, if the device 202 is a multi-function printer and scanner device, the validation component 218 may be triggered once the device 202 has performed 100 print and/or scanning jobs, or has performed 1000 print and/or scanning jobs. This device usage count may also be configurable, for example, depending on the type of device, or depending on the location of the device (i.e. a high-usage device may have a higher threshold than a low-usage device). A combination of these validation conditions 260 may be implemented and stored in the memory 214 of the device 202.

Finally, a location information storage and retrieval component 224 is configured to communicate with an external server 240 having memory 242, via the input/output interface 230, in order to store and retrieve location information in the memory 242 of the server 240. The location information stored may include, in various embodiments, the user-supplied floorplan 250, the extracted location features 252, the network information 254 associated with the device 202, the processed floorplan 256 (i.e. floorplan 300 of FIG. 3), and the deployment location 258 of the device 202. When the validation component 220 is triggered, the information component 224 may retrieved location information stored in the memory 242 of the server 240, such as the user-supplied floorplan 250, the extracted location features 243, the processed floorplan 256, the deployment location 258 of the device 202, and other information. Then, as discussed above, the validation component 220 may prompt a user to validate the deployment location 258 of the device 202 by displaying, via the user interface component 222, information retrieved from the server 240. For example, the processed floorplan 256 may be displayed on the display device 204 (e.g., a touchscreen display) via the user interface component 222, along with the deployment location on the user interface device 204, and receive input from the user via the input/output device 204 validating or invalidating the deployment device 258. If the deployment location 258 is invalid (i.e., does not match the current location of the device 202), then the user may update the deployment location 258 by selecting a new extracted location feature 252 via the input/output device 204. The user interface component 222 receives the input 208, 210, and the validation component 220 instructs the floorplan processing component 218 to update the processed floorplan 256 to identify the new deployment location 258 and instructs the storage component 224 to store the new location information in the memory 242 of the server 240.

Figure 4:
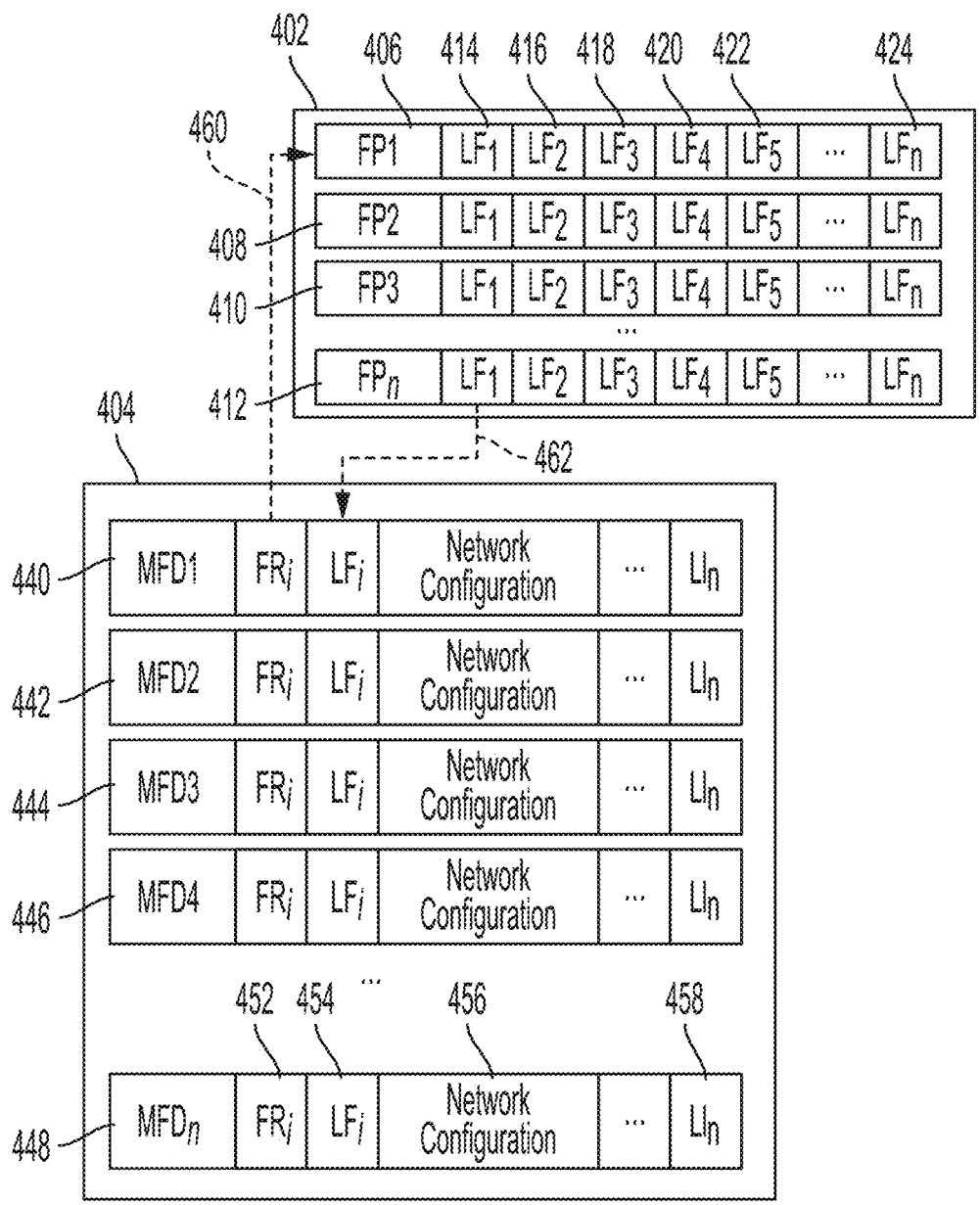
FIG. 4 illustrates possible data structures stored in a server in accordance with on aspect of the disclosure.

The information storage and retrieval component 224 may cause the location information to be stored in several ways to promote efficiency and ensure accuracy of the location information. For example, with reference to FIG. 4, the component 224 may independently maintain a floorplan database 402 and a device database 404 in the memory 242 of the server 240. The floorplan database 402 can contain a plurality of floorplans 406, 408, 410, 412, each floorplan having a plurality of location features 414, 416, 418, 420, 422, 424. Each floorplan 406, 408, 410, 412 data structure may contain the user-supplied floorplan, as well as the processed floorplan. Further, the location features 414, 416, 418, 420, 422, 424 may correspond to potential deployment locations (e.g., rooms, etc.) for the tracked device. The device database 404 may record a plurality of devices 440, 442, 444, 446, 448, the floorplan 452 and location feature 454 corresponding to the device's deployment location, as well as additional information, such as network configuration information 456 and other relevant location information 458. In particular embodiments, the databases 402, 404 may make reference 460, 462 to one another to reduce data duplication. For example, the device database 404 may store a reference 452 to the relevant floorplan of the floorplan database 402, and for each location feature 414, 416, 418, 420, 422, 424 of the floorplans 406, 408, 410, 412, the floorplan database 402 may store a reference 462 to each device deployed at that location. However, other data structures and methods of storing location information are contemplated.

Figure 5:
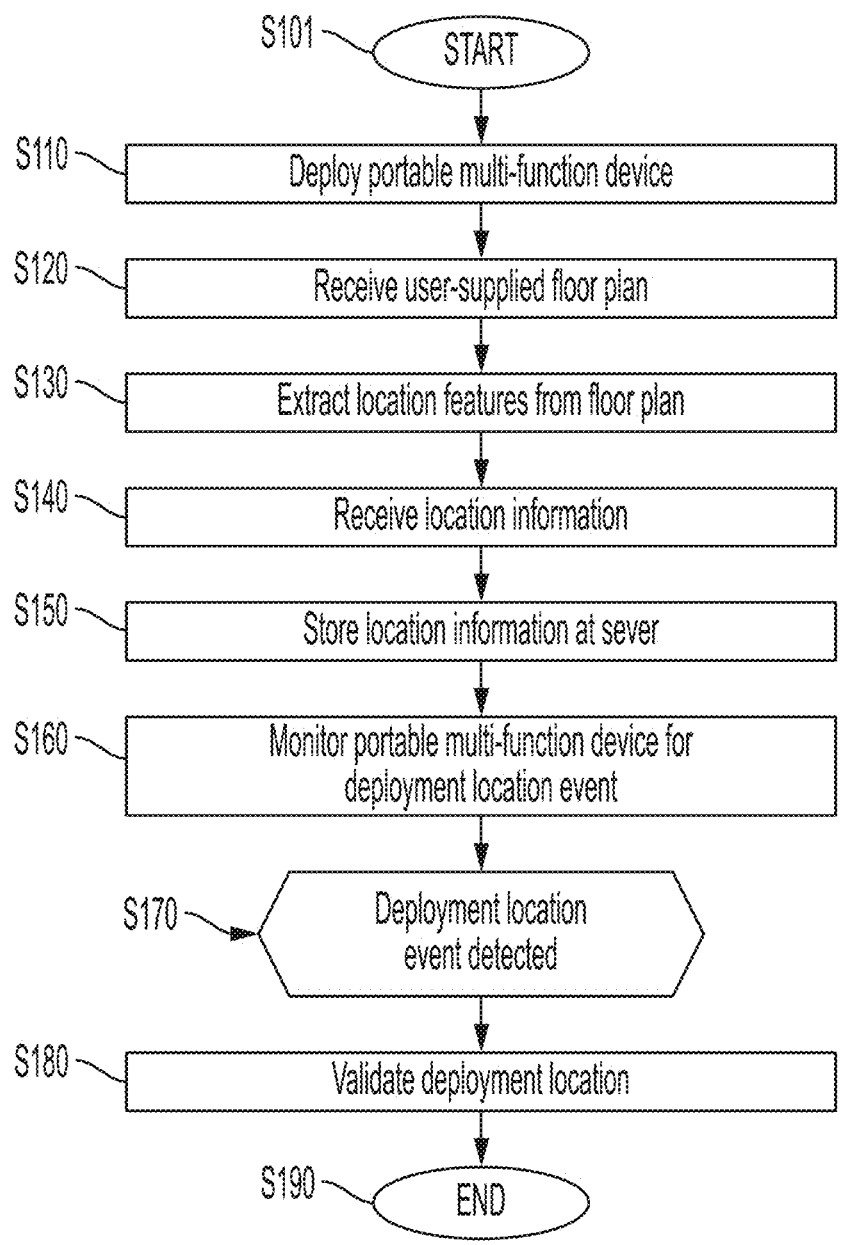
FIG. 5 is a flowchart illustrating a method of tracking the deployment location of a portable multi-function device in accordance with at least one embodiment.

With reference to FIG. 5, a method for tracking a deployment location of a portable multi-function device, or a plurality of multi-function devices, is illustrated, which can be performed with the system and apparatus of FIGS. 1-4. The method begins at S101. It is assumed that a device, such as a multi-function device, has been provided.

At S110, a portable multi-function device 110 is deployed at a deployment location. As described above, the device 110 can comprise a user interface device, a network interface device, a processor, and a non-transitory computer-readable memory device containing programming instructions that are configured to instruct the processor to receive a user-supplied floorplan 125, 126 associated with the deployment location of the device 110, process the user-supplied floorplan 125, 126 to extract one or more location features corresponding to one or more potential deployment locations of the device 110, receive input from a user 120, 121, via the user interface device, such as the deployment location of the device 110 and/or a validation signal of the deployment location, and communicate with a server 140 via the network interface, to send and receive location information associated with the device 110 that is to be stored in a memory 150 of the server 140. In particular embodiments, the location information stored in the memory 150 of the server 150 includes at least one of: the user-supplied floorplan 125, 126, the processed user-supplied floorplan, the one or more location features extracted from the floorplan 125, 126, and the input received from the user 120, 121, such as the deployment location of the device 110 or the validation signal of the deployment location.

At S120, a user-supplied floorplan 125, 126 is received at the device 110. In particular embodiments, the device 110 may include an image capture device (e.g., a scanner, camera, etc.), and the user 120, 121 uses the image capture device to scan a physical copy of the floorplan 125, 126. In other embodiments, a secondary device 122 may be used by the user 121 to provide an electronic version of the floorplan 125, 126.

At S130, the user-supplied floorplan 125, 126 is processed, at the device 110, to extract one or more location features. In particular embodiments, the location features correspond to possible deployment locations for the device 110 (e.g., individual rooms shown in the floorplan 125, 126).

At S140, location information is received identifying the deployment location of the device 110. In particular embodiments, the location information includes input from the user 120, 121, via the user interface device, identifying the deployment location of the device 110 among the one or more extracted location features. That is, the user 120, 121 may use the user interface device (e.g., touchscreen display), to select one of the one or more extracted location features as the deployment location for the device 110. In further embodiments, the location information can include other input received at the device 110, such as network configuration information associated with the device 110 (e.g., IP address, etc.). Additional location information may be received via the user interface device or the network interface.

At S150, the location information associated with the device 110 is stored in the memory 150 of the server 140. As discussed above, this location information can include, for example, the user-supplied floorplan 125, 126, the processed user-supplied floorplan, the extracted location features, the deployment location, input from the user 120, 121, network configuration information, and the like.

At S160, the device 110 is monitored, via the processor, for a deployment location event, which signals that the deployment location of the device 110 has changed or should be confirmed. In particular embodiments, network configuration information is received and checked against the network configuration information stored in the server 140, and the deployment location event is a change in network topology (i.e. network configuration information, such as a new IP address). In other embodiments, the deployment location event may be triggered by meeting a pre-determined threshold, such as an amount of elapsed time since the last deployment location validation, or the threshold may be based upon the number of times the device 110 has been used since the last deployment location validation. These thresholds may be pre-determined and may be configurable by its user 120, 121. In still further embodiments, the deployment location event may be triggered based on feedback received from an accelerometer (e.g., indicating that the device may have moved), as well as based on the location of users who have been known to have used or been near the device. Further, the deployment location event may be triggered by some combination of such triggers.

At S170, a deployment location event is detected, as discussed above, which triggers the validation of the deployment location of the device 110.

At S180, the deployment location of the device 110 is validated by a user 120, 121. In particular embodiments, the deployment location and other location information of the device 110 stored in the memory 150 of the server 140 is retrieved, such as by the network interface, and is displayed to a user 120, 121, via the user interface device of the device 110. The device 110 may then prompt the user 120, 121, via the user interface device, to confirm whether the retrieved deployment location is valid (i.e. correct). The device 110 receives, via the user interface device, a validation signal of the deployment location for the device 110 from the user 120, 121, indicating whether the deployment location is valid.

In some embodiments, if the deployment location retrieved from the server 140 is no longer valid (i.e. the validation signal received from the user 120, 121 indicates the location is not correct), then the deployment location for the device 110 must be updated. In particular embodiments, this includes receiving new location information associated with the device 110. For example, the user 120, 121 may select a new deployment location that corresponds to a different location feature extracted from the user-supplied floorplan 125, 126.

Alternatively, if the device 110 is no longer located anywhere represented in the user-supplied floorplan 125, 126, the user 120, 121 may need to provide a new user-supplied floorplan 120, 121 to be processed (i.e. repeat steps S120-S150). In such embodiments, a new user-supplied floorplan 125, 126 may be received, via the user interface device or network interface, and processed to extract one or more new location features corresponding to one or more potential new deployment locations of the device 110. Then, the device 110 may receive input from the user 120, 121, selecting one of the new deployment locations that correspond to the extracted location features, and the new location information (e.g., new user-supplied floorplan, new processed floorplan, new location features, new deployment location, new network configuration information, and the like) is stored in the memory 150 of the server 140.

At a step S190, the method may end.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A system for tracking a deployment location of a plurality of portable multi-function devices, the system comprising:
   the plurality of portable multi-function devices, each portable multi-function device comprising:
   a user interface;
   a network interface;
   a processor; and
   a non-transitory computer-readable memory device containing programming instructions that are configured to instruct the processor to:
     receive a user-supplied floorplan associated with the portable multi-function device;
     process the user-supplied floorplan to extract one or more location features of the user-supplied floorplan;
     receive input from a user, via the user interface device, wherein the input includes at least one of:
       the deployment location of the portable multi-function device; and
       a validation signal of the deployment location of the portable multi-function device;
     communicate with a server, via the network interface, to send location information associated with the portable multi-function device to be stored in a memory of the server; and
     communicate with the server, via the network interface, to receive location information associated with the portable multi-function device stored in the memory of the server;
     wherein the location information associated with the portable multi function device includes at least one of: the user-supplied floorplan; the one or more location features extracted from the user-supplied floorplan; and the input received from the user,
     wherein the floorplan associated with the portable multi-function device includes a plurality of potential deployment locations for the portable multi-function device,
     wherein the one or more location features extracted from the image correspond to one or more potential deployment locations of the plurality of potential deployment locations for the portable multi-function device, wherein the deployment location of the portable multi-function device corresponds with one of the location features extracted from the image;
     wherein the non-transitory computer-readable memory device containing programming instructions are further configured to instruct the processor to:
       process, via the processor, the user-supplied floorplan to graphically identify at least one of the one or more extracted location features; and
       display, via the user interface device, the processed image wherein the location information associated with the portable multi-function device can further include the processed user-supplied floorplan and
     wherein the non-transitory computer-readable memory device containing programming instructions are further configured to instruct the processor to:
       prompt the user, via the user interface device, to validate the deployment location of the portable multi-function device by:
         receiving, from memory of the server, the location information associated with the portable multi-function device, wherein the location information includes the stored deployment location of the portable multi-function device and the processed user-supplied floorplan;
         presenting the location information to the user via the user interface device; and
         requesting input from the user, via the user interface device, wherein the input is the validation signal.

2. The system of claim 1, wherein the portable multi-function device further comprises an image capture device, and the non-transitory computer-readable memory device containing programming instructions that are further configured to instruct the processor to:
   cause the image capture device to capture an image; and
   receive the image captured by the image capture device;
   wherein the captured image is the user-supplied floorplan associated with the portable multi-function device.

3. The system of claim 1, wherein the user-supplied floorplan is received via the network interface.

4. The system of claim 1, wherein the system further comprises:
   a server associated with the plurality of portable multi-function devices, the server comprising:
     a network interface connecting the server with the portable multi-function device/plurality of portable multi-function devices;
     a processor; and
     a non-transitory computer-readable memory device containing stored location information for the plurality of portable multi-function devices, and containing programming instructions that are configured to instruct the processor to:
       communicate with the plurality of portable multi-function devices, via the network interface, to receive location information associated with the plurality of portable multi-function devices from the plurality of portable multi-function devices;
       communicate with the plurality of portable multi-function devices, via the network interface, to send location information associated with the plurality of portable multi-function devices to the plurality of portable multi-function devices; and
       store the location information associated with the plurality of portable multi-function devices in the memory.

5. The system of claim 1, wherein the user is prompted to validate the deployment location of the portable multi-function device based upon a deployment location event.

6. The system of claim 5, wherein the location information associated with the portable multi-function device includes network configuration information for the portable multi-function device, and the deployment location event is a change in the network configuration of the portable multi-function device.

7. The system of claim 5, wherein the deployment location event is based upon a pre-determined duration of time or a pre-determined number of uses of the portable multi-function device.

8. The system of claim 5, wherein the non-transitory computer-readable memory device containing programming instructions are further configured to instruct the processor to:
   update the deployment location of the portable multi-function device based upon input received from the user via the user interface device.

9. The system of claim 1, wherein the user interface device comprises a touchscreen display.

10. The system of claim 1, wherein the portable multi-function user device is not GPS-enabled.

11. The system of claim 1, wherein the system further comprises a user-supplied floorplan, and wherein the non-transitory computer-readable memory device containing programming instructions that are further configured to instruct the processor to:
   receive, via the network interface, the user-supplied floorplan from the user; and
   process the user-supplied floorplan to extract one or more location features of the user-supplied floorplan.

12. The system of claim 11, wherein the location information associated with the portable multi-function device further includes the user-supplied floorplan.

13. A method of tracking a deployment location of a plurality of portable multi-function devices, the method comprising:
   deploying the plurality of portable multi-function devices, each device having a user interface device, a network interface, and a processor configured to:
      receive a user-supplied floorplan associated with the deployment location of the portable multi-function device;
      process the user-supplied floorplan to extract one or more location features corresponding to one or more potential deployment locations of the portable multi-function device;
      receive input from a user, via the user interface device, wherein the input includes at least one of: the deployment location of the portable multi-function device; and a validation signal of the deployment location of the portable multi-function device;
      communicate with a server, via the network interface, to send location information associated with the portable multi-function device to be stored in a memory of the server; and
      communicate with the server, via the network interface, to receive location information associated with the portable multi-function device stored in the memory of the server;
      wherein the location information includes at least one of: the user-supplied floorplan; the processed user-supplied floorplan; the one or more location features extracted from the user-supplied floorplan; and the input received from the user;
   receiving, at the portable multi-function device, the user-supplied floorplan;
   processing, at the portable multi-function device, the user-supplied floorplan to extract the one or more location features;
   receiving input from the user, via the user interface device, identifying the deployment location of the portable multi-function device, wherein the deployment location corresponds to one of the one or more location features extracted from the user-supplied floorplan;
   storing the location information associated with the portable multi-function device in the memory of the server;
   monitoring the portable multi-function device for a deployment location event; and
   upon occurrence of the deployment location event, validating the deployment location of the portable multi-function device via the user interface device,
   wherein the deployment location of the portable multi-function device is validated by:
   retrieving, via the network interface, the deployment location of the portable multi-function device from the server;
   displaying, via the user interface device, the location information associated with the portable multi-function device;
   prompting the user, via the user interface device, to confirm the deployment location of the portable multi-function device;
   receiving, via the user interface device, a validation signal of the deployment location of the portable multi-function device indicating whether the deployment location is valid;
   if the retrieved deployment location is no longer valid, receiving new location information of the portable multi-function device from the user, the new location information including at least a new deployment location for the portable multi-function device; and
   storing the new location information of the portable multi-function device in the memory of the server.

14. The method of claim 13, wherein the new location information received from the user further includes a new user-supplied floorplan, and the method further comprises:
   receiving the new user-supplied floorplan;
   processing the new user-supplied floor to extract one or more location features corresponding to one or more potential deployment locations of the portable multi-function device; and
   receiving input from the user, via the user interface device, identifying the new deployment location of the portable multi-function device, wherein the deployment location corresponds to one of the one or more location features extracted from the new user-supplied floorplan;
   wherein the new location information further includes the new user-supplied floorplan and the processed user-supplied floorplan.

15. The system of claim 13, wherein the location information of the portable multi-function device includes network configuration information of the portable multi-function device, and the deployment location event is triggered when a change in the network configuration information is detected.

16. The system of claim 13, wherein the deployment location event is triggered upon a pre-determined duration of time or a pre-determined number of uses of the portable multi-function device.

* * * * *